United States Patent
Puckett et al.

(10) Patent No.: US 11,181,214 B2
(45) Date of Patent: Nov. 23, 2021

(54) PIPE COUPLING

(71) Applicant: PHILMAC PTY LTD, North Plympton (AU)

(72) Inventors: Geoffrey B. Puckett, Glenelg East (AU); Malcolm J. Pridham, Sheidow Park (AU)

(73) Assignee: PHILMAC PTY LTD

( * ) Notice: Subject to any disclaimer, the term of this patent is extended or adjusted under 35 U.S.C. 154(b) by 102 days.

(21) Appl. No.: 16/013,489

(22) Filed: Jun. 20, 2018

(65) Prior Publication Data

US 2019/0390801 A1 Dec. 26, 2019

(51) Int. Cl.
*F16L 19/02* (2006.01)

(52) U.S. Cl.
CPC ....... *F16L 19/0218* (2013.01); *F16L 19/0231* (2013.01)

(58) Field of Classification Search
CPC . F16L 19/065; F16L 19/0653; F16L 19/0656; F16L 19/08; F16L 19/083; F16L 19/086; F16L 21/007
USPC ................. 285/343, 342, 247, 245
See application file for complete search history.

(56) References Cited

U.S. PATENT DOCUMENTS

| | | | | |
|---|---|---|---|---|
| 5,593,186 A | * | 1/1997 | Harris | F16L 19/086 285/23 |
| 6,145,893 A | * | 11/2000 | Kuo | F16L 27/026 285/302 |
| 6,378,915 B1 | * | 4/2002 | Katz | F16L 19/086 285/342 |
| 6,851,728 B2 | * | 2/2005 | Minami | F16L 19/086 285/113 |
| 2004/0041399 A1 | * | 3/2004 | Chelchowski | F16L 19/075 285/343 |
| 2004/0090067 A1 | * | 5/2004 | Pridham | F16L 19/075 285/328 |
| 2017/0082229 A1 | * | 3/2017 | Meissner | F16L 19/08 |

* cited by examiner

*Primary Examiner* — Aaron M Dunwoody
(74) *Attorney, Agent, or Firm* — Sand, Sebolt & Wernow Co., LPA

(57) ABSTRACT

A pipe coupling including an externally threaded body and an internally threaded nut. The nut's outer end includes an outwardly converging internal circular surface and a spacer is co-operable with the nut and body. The coupling further includes an O-ring and a deformable gripping member. The gripping member has an internal surface with barbs extending radially inwardly therefrom. An end of a pipe is insertable through said gripping member, spacer and O-ring into the body. Tightening of the nut causes axial movement of said spacer, sealing engagement of said O-ring to the body and pipe, and radially inward deformation of said gripping member such that said barbs clamp the pipe. The diameter of the O-ring is greater than that of the spacer at points where it is secured before tightening of the nut and less than that of the spacer when the nut has been tightened.

2 Claims, 1 Drawing Sheet

PIPE COUPLING

FIELD OF THE INVENTION

This invention relates to a coupling which is suitable for engaging the outer surface of a polymeric pipe.

BACKGROUND TO THE INVENTION

Couplings and transition fittings of the type having a gripping member are known. In general these couplings include a nut, body, gripping member having a plurality of inwardly directed barbed projections, as well as a sub-assembly of a compression sleeve and resilient gasket ring that is typically permanently attached to the inner end of the compression sleeve. The nut and the gripping member include abutting tapered surfaces. A pipe end is freely insertable through the sub-assembly and into a socket in the body of the coupling. As the nut is tightened it exerts both a radial and longitudinal force on the grip ring that in turn longitudinally exerts a force on the sleeve and gasket ring. The gasket ring encounters an abutment in a socket in the body, and further tightening of the nut then further radially compresses the gripping member so that its inwardly directed barbed projections engage the outer surface of a pipe to which the coupling is attached. There may also be provided abutment surfaces within the body of the coupling and the nut that abut inner and outer surfaces of a flange outstanding from the outer end of the compression sleeve.

One skilled in the art will appreciate that as the nut is tightened, the tapered surface of the nut acts upon the tapered surface of the gripping member causing it to be both compressed and urged into the body. As the gripping member engages the pipe it is also drawn into the assembly.

Whilst this works well, depending on the fluid that the pipes carry the gasket ring has to securely seal between the pipe and body. It is an object of the present invention to provide for a modified sleeve with a gasket ring that ensures a secure seal when the pipe is used to convey gas or to provide the public with a useful alternative.

SUMMARY OF THE INVENTION

In a first aspect the invention comprises a pipe coupling comprising:
   a body having external threads and axially aligned annular inner surfaces;
   a nut having internal threads adjacent an inner end thereof engaging the body external threads, the nut having an outwardly converging internal circular surface at its outer end;
   an spacer co-operable with the nut and co-operable with the body upon tightening of the nut the spacer at its inner end being of a smaller diameter than at its outer end abutting the grip ring;
   a resilient O-ring secured to an inner end of said sleeve;
   a deformable gripping member having an axially outwardly converging outer surface complementary to said axially outwardly converging internal nut surface, the gripping member having an internal surface with barbs extending radially inwardly therefrom;
   such that an end of a pipe is freely insertable through said gripping member, spacer and O-ring into the body, and tightening of said nut over said external threads causes axial movement of said spacer, sealing engagement of said O-ring the said body and the pipe, and radially inward deformation of said gripping member such that said barbs clamp such pipe; and
   wherein the O-ring diameter is greater than that of the spacer at the points where it is secured before tightening of the nut and less than that of the spacer when the nut has been tightened.

It should be noted that any one of the aspects mentioned above may include any of the features of any of the other aspects mentioned above and may include any of the features of any of the embodiments described below as appropriate.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Figure 1:
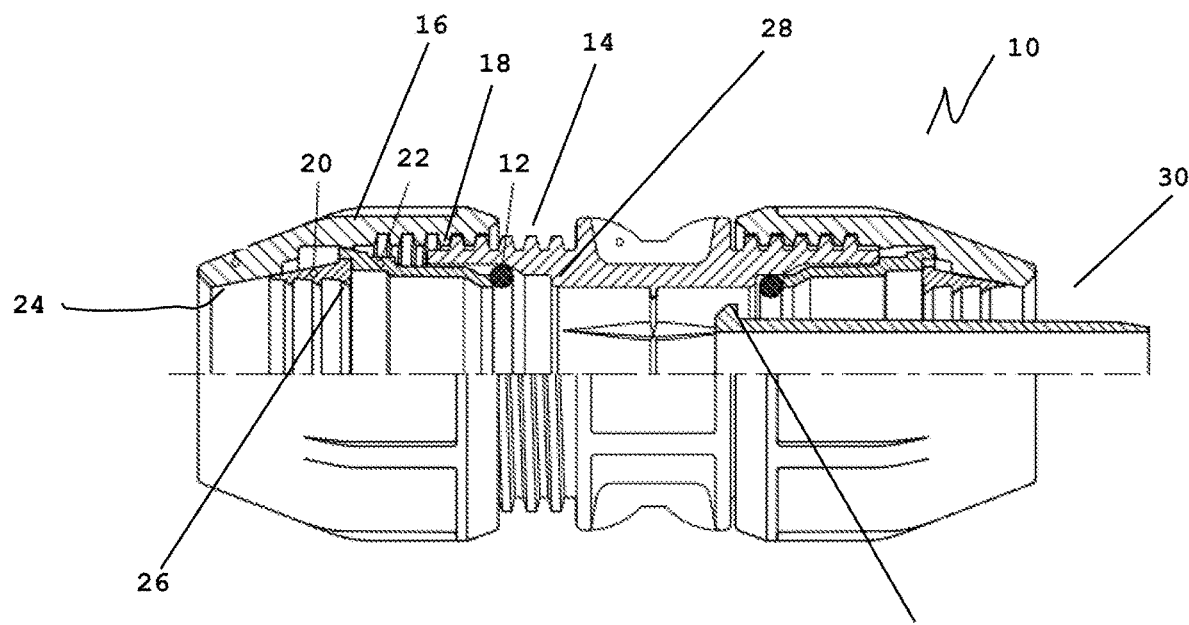
FIG. 1 is a partial cross-sectional view illustrating a coupling embodying the present invention.
Figure 2:
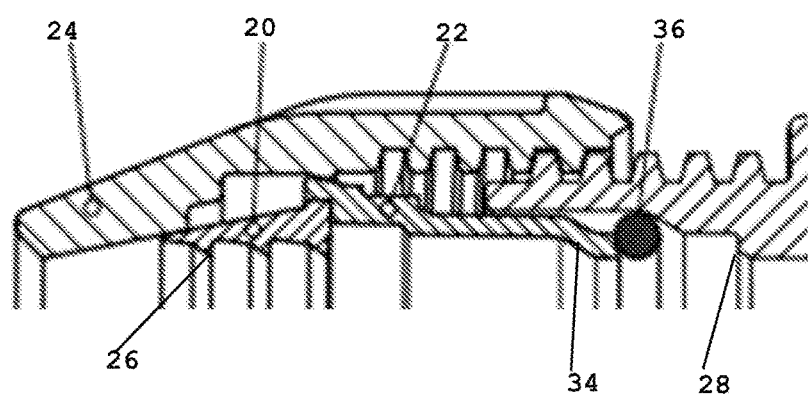
FIG. 2 is an enlarged view of a section of the coupling of FIG. 1.

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

The coupling described has particular application for gas, but may equally well be used for other fluids such as water or petroleum.

Shown in the Figures is a coupling 10 for outer surface engagement of a pipe (not shown). The illustrated coupling shows two ends adapted to join or couple two pipes. However it may equally include only one end where, for example, the coupling is used to act as a stop for a pipe, or a three way connection.

The coupling 10 includes a longitudinal body 12 having male threads 14, the threads adapted for use by nut 16 having internal threads 18 that engage the male threads 14.

FIG. 1 illustrates on the left hand side the coupling in a state when a pipe is to be inserted into the coupling but not engaged while it shows on the right hand side the coupling when a pipe has effectively been fully engaged by the coupling.

Located within the nut and the body is a grip ring 20 and a spacer 22. The end of the nut 16 includes an outwardly converging surface 24. As the nut is tightened onto the body it causes the grip ring to move laterally into the body and also radially inwardly. The grip ring has teeth or barbed projections 26 that bite into or engage a pipe drawing it inwardly into the body when the nut is tightened. The grip ring 20 abuts the spacer 22 also moving it inwardly into the body. The body 12 includes a shoulder 28 constituting an abutment surface for the grip ring 20.

The pipe 12 is typically mounted on a liner 30 so that it is not compressed when under the force of the grip ring and abutting flange 32. The nut outwardly converging surface 24 engages the tapered surface on the grip ring so that as the nut is screwed onto the body it causes the grip ring to be forced radially inward. The reader should now appreciate that as the grip ring and pushes it radially inwardly, the barbs biting into the pipe and dragging it and the liner further into the body 12 at the same time pushing the spacer 22 until it abuts the body. With the nut being further screwed onto the body the spacer remains in place but the grip ring is compressed downwardly.

As illustrated on the LHS of FIG. 1, the spacer includes a downward web 34 with an O-ring 36 attached at its end the O-ring extending beyond the diameter of the spacer at its joint. The body however also extends downwardly so that when the nut has been fully screwed on the O-ring 36 as illustrated on the RHS of FIG. 1 has been slightly compressed and pushed downward to create a strong seal between the body and the pipe (not shown).

Thus the reader should understand the present invention. When a pipe is inserted into the coupling, initial tightening of the nut will cause the grip ring to engage the pipe and draw it in radially together with the spacer causing the grip ring O-ring to be compressed. The spacer and the grip ring will then engage an abutment surface in the body at which stage they will stop moving radially. However the nut will compress the grip ring to further engage the pipe through its barbs to lock it into place. A liner ensures that the pipe is not deformed during this action.

If the pipe is not inserted into the body and the nut is screwed forwardly, the pipe will not be able to be forced inwardly to the body unless the nut is screwed back to its loose state.

In this embodiment the O-ring diameter is initially greater than the end of the spacer but as it is compressed against the body it is forced downwardly until its inner diameter is smaller than that of the spacer.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus. It is also to be understood that reference to any prior art is not to be taken as an admission that that prior art is part of the common general knowledge.

LIST OF COMPONENTS

Coupling 10
Body 12
Male threads 14
Nut 16
Internal threads 18
Grip ring 20
Spacer 22
Converging surface 24
Teeth 26
Shoulder 28
Liner 30
Flange 32
Web 34
O-ring 36

In any claims that follow and in the summary of the invention, except where the context requires otherwise due to express language or necessary implication, the word "comprising" is used in the sense of "including", i.e. the features specified may be associated with further features in various embodiments of the invention.

Further advantages and improvements may very well be made to the present invention without deviating from its scope. Although the invention has been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus. Any discussion of the prior art throughout the specification should in no way be considered as an admission that such prior art is widely known or forms part of the common general knowledge in this field.

In the present specification and claims (if any), the word "comprising" and its derivatives including "comprises" and "comprise" include each of the stated integers but does not exclude the inclusion of one or more further integers.

The invention claimed is:
1. A pipe coupling comprising:
 a body having external threads and axially aligned annular inner surfaces;
 a nut having internal threads adjacent an inner end thereof, said internal threads of the nut for engaging the external threads of the body, the nut having an outwardly converging internal circular surface at the outer end of the nut;
 a spacer co-operable with the nut and co-operable with the body upon tightening of the nut, said spacer having:
  an outer end defining a first opening therein of a first diameter;
  an inner end located remote from the outer end and defining a second opening therein of a second diameter, wherein the second diameter is smaller than the first diameter;
  a shoulder located proximate the outer end; and
  a downward web located proximate the inner end of the spacer, wherein the downward web tapers in diameter moving in a direction from the outer end and towards the inner end;
 a resilient O-ring secured to the inner end of said spacer and extending outwardly beyond points where the inner end of the spacer joins the O-ring;
 a deformable gripping member abutting the shoulder of the spacer, said gripping member having an axially outwardly converging outer surface complementary to said axially outwardly converging internal circular surface of the nut, the gripping member having an internal surface with barbs extending radially inwardly therefrom;
 wherein an end of a pipe is freely insertable through said gripping member, the spacer and the O-ring and into the body, and tightening of said nut over said external threads of the body causes axial movement of said spacer, sealing engagement of said O-ring, the body and the pipe, and radially inward deformation of said gripping member such that said barbs clamp the pipe;
 wherein the O-ring diameter is greater than that of the spacer at points where the O-ring is secured to the spacer before tightening of the nut and wherein the

O-ring diameter is less than that of the spacer when the nut has been tightened; and wherein the body extends downwardly so that when the nut has been fully screwed, the O-ring is compressed and pushed downwardly to create a seal between the body and the pipe.

2. The pipe coupling according to claim 1, wherein the resilient O-ring extends axially outwardly beyond the inner end of the spacer and further extends radially outwardly beyond an exterior surface of the inner end of the spacer both before compression of the O-ring and after compression of the O-ring.

* * * * *